United States Patent Office 3,676,088
Patented July 11, 1972

3,676,088
COMPOSITE ARTICLE
Michael J. Pryor, Woodbridge, Stanley Shapiro, New Haven, Derek E. Tyler, Cheshire, and John Shabarack, Guilford, Conn., assignors to Olin Corporation
No Drawing. Filed Mar. 3, 1971, Ser. No. 120,742
Int. Cl. B21b 3/00; B32b 15/20
U.S. Cl. 29—199
10 Claims

ABSTRACT OF THE DISCLOSURE

The disclosure teaches a composite cuprous article particularly useful as a brazing sheet. The composite has a core of a copper base alloy having a solidus temperature in excess of 1900° F. clad with a dissimilar copper base alloy containing from 22 to 40% manganese.

BACKGROUND OF THE INVENTION

The present invention relates to cuprous structures that are useful for brazing to other cuprous structures. More particularly, the present invention relates to cuprous structures, i.e., structures of copper or copper base alloys upon which a layer or layers of a dissimilar copper base alloy have been metallurgically bonded thereto so that by exposure to predetermined elevated temperatures the structures may readily be brazed to other cuprous structures.

Brazing of copper and copper alloys is currently conducted with the use of separate filler metals. The most popular low cost copper brazing alloys are copper-5% phosphorus alloys, and copper-7% phosphorus alloys. Alternatively, for lower temperature brazing, silver base alloys are occasionally used.

The brazing may be conducted either with or without protective fluxes. Where protective fluxes are not used, some type of controlled atmosphere must be employed in order to inhibit gross oxidation.

The copper-phosphorus alloys are generally available as wire or powders which are applied in the joint areas. Generally, these materials often present problems since it is not possible to roll such alloys with reasonsable economies because of their brittleness.

It is highly desirable to develop an alternate method for brazing copper alloys which involves the use of composites wherein a relatively low melting alloy sheet is metallurgically bonded to a dissimilar core having a higher melting point. This type of approach provides a greater amount of flexibility provided that the composite can be easily brazed together and that high strength bonds can be obtained either using protective fluxes or inert atmospheres.

Accordingly, it is a principal object of the present invention to provide a novel cuprous composite.

It is a further object of the present invention to provide a cuprous brazing structure which overcomes the aforementioned disadvantages. It is a particular object of the present invention to provide a cuprous brazing structure as aforesaid which can be easily brazed together and which provides excellent high strength bonds either using protective fluxes or inert atmospheres.

Further objects and advantages of the present invention will appear from the ensuing discussion.

SUMMARY OF THE INVENTION

In accordance with the present invention, it has been found that the foregoing objects and advantages may be readily obtained.

The present invention provides a novel cuprous composite especially useful as a cuprous brazing structure. The composite of the present invention has a core of a copper base alloy having a solidus temperature in excess of 1900° F. clad with a dissimilar copper base alloy containing from 22 to 40% manganese. The clad should not exceed 75% of the thickness of the structure. The cladding preferably has a liquidus temperature no higher than 1700° F. and the core preferably exhibits substantial resistance to grain growth at elevated temperatures.

DETAILED DESCRIPTION

In accordance with the present invention the core may be clad on one side or on both sides. The core is a copper base alloy having a solidus temperature in excess of 1900° F. Preferably, the core should exhibit substantial resistance to grain growth at elevated temperatures. Representative materials which may readily be used as the core include any of the following: pure copper, any of the deoxidized coppers, copper-iron alloys containing up to 3.5% iron and preferably from 1 to 3.5% iron. In addition, copper alloys may be used as a core material which contain alloying additions selected from the following group: chromium up to 1.5%; zirconium up to 1.5%; manganese up to 3%; cobalt up to 3%; nickel up to 35%; iron as aforesaid; and mixtures thereof.

Particularly preferred core materials are the copper alloys containing from 1.5% to 3.5% iron, from 0.01 to 0.15% phosphorus and from 0.03 to 0.20% zinc since these materials generally have high solidus temperatures close to 2000° C. and thereby provide a generous temperature range in which a composite sheet can be brazed.

The core material is clad with a dissimilar copper base alloy containing from 22 to 40% manganese and preferably from 25 to 35% managanese. Preferably, iron is incorporated in the cladding in an amount from 0.1 to 2.0% and preferably from 0.5 to 1.5%. Other particularly preferred additives are: aluminum from 0.1 to 5% and preferably from 0.5 to 3.5% and zinc from 2 to 10% and preferably from 3 to 5%. The cladding may contain additives to attain particularly desirable results, for example, a material selected from the group consisting of phosphorus, antimony, lithium and boron, up to 0.3% each and preferably up to 0.1% each, lead, tin, silicon, cobalt, magnesium and nickel, up to 5% each and preferably up to 3% each. The cladding material should have a liquidus temperature of no higher than 1700° F. The azeotrope at approximately 32% manganese has a liquidus temperature of approximately 1610° F. These alloys exhibit excellent hot and cold rollability and can be easily prepared in sheet form.

The clads indicated hereinabove can be readily combined in a metallurgically bonded composite with copper and preferably with alloys exhibiting substantial resistance to grain growth at elevated temperatures.

The composites may be metallurgically bonded together by any method which provides a good bond. A preferred method is by rolling the core and cladding together, although other methods may be readily used.

The core and cladding may, of course, contain impurities common for alloys of these types and they may also contain additives to achieve particularly desirable results.

As stated hereinabove, the composites may be clad on one or both sides of the core alloy depending upon the brazing requirements. The thickness of the cladding material is not particularly critical but generally should not exceed 75% of the thickness of the composite.

In accordance with the present invention it has been found that the cuprous composite thereof can be easily brazed together by heating above the liquidus of the cladding and below the solidus of the core material. It has been found that excellent high strength bonds are obtained using the composite of the present invention either using protective fluxes or inert atmospheres. Furthermore, the composite of the present invention may be readily combined and metallurgically bonded in an inexpensive and convenient manner.

The cladding metal may also find considerable advantage when utilized with iron or nickel base core materials, e.g. stainless steels, monel nickel, etc. These composites also find application in brazing.

The present invention will be more readily apparent from a consideration of the following illustrative examples.

Example I

The binary copper-25% manganese alloy was prepared and clad upon both sides of a copper base alloy containing 2.3% iron, 0.03% phosphorus, and 0.08% zinc. The materials were readily clad together in a firm metallurgical bond by rolling. A simple T joint was prepared from two pieces of this composite in an inert atmosphere at a temperature of 1850° F. Excellent flow of the cladding material was obtained as illustrated by a smooth well developed fillet on both sides of the T joint.

Example II

The composite of Example II was prepared in a manner after Example I. Two pieces of the composite were formed into a 45° lap shear joint. Brazing was accomplished by heating at 1850° F. in an inert atmosphere. The strength of the joint after cooling to room temperature was 39,000 p.s.i. A microsection of the brazed joint showed that tensile failure occurred in the core material rather than at the brazed metal interface.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A cuprous composite having a core of a copper base alloy having a solidus temperature in excess of 1900° F. clad with a dissimilar copper base alloy containing from 22 to 40% manganese.

2. A cuprous composite according to claim 1 wherein the cladding does not exceed 75% of the thickness of the composite.

3. A structure according to claim 2 wherein the core is clad on both sides with said cladding.

4. A structure according to claim 2 wherein said cladding contains 25 to 35% manganese.

5. A structure according to claim 2 wherein said cladding contains iron in an amount from 0.1 to 2.0%, aluminum from 0.1 to 5.0% and zinc from 2 to 10%.

6. A structure according to claim 2 wherein said core contains a material selected from the group consisting of iron up to 3.5%, chromium up to 1.5%, zirconium up to 1.5%, manganese up to 3%, cobalt up to 3%, and mixtures thereof.

7. A structure according to claim 6 wherein said core is a copper base alloy containing iron from 1.5 to 3.5%, phosphorus from 0.01 to 0.15%, zinc from 0.03 to 0.20% and the balance copper.

8. A structure according to claim 2 wherein said cladding has a liquidus temperature no higher than 1700° F.

9. A structure according to claim 8 wherein said core exhibits substantial resistance to grain growth at elevated temperatures.

10. A cuprous brazing structure having a core of a copper base alloy having a solidus temperature in excess of 1900° F. clad with a dissimilar copper base alloy containing from 22 to 40% manganese wherein the cladding does not exceed 75% of the thickness of the composite.

References Cited

UNITED STATES PATENTS

| 3,183,588 | 5/1965 | Pruna | 29—199 X |
| 3,359,084 | 12/1967 | Cape | 29—199 X |
| 3,381,364 | 5/1968 | Winter | 29—472.3 |
| 3,496,625 | 2/1970 | Winter | 29—199 |

L. DEWAYNE RUTLEDGE, Primary Examiner

J. E. LEGRU, Assistant Examiner

U.S. Cl. X.R.

29—194